United States Patent [19]
Bolton

[11] Patent Number: 5,691,918
[45] Date of Patent: Nov. 25, 1997

[54] CIRCUIT AND METHOD FOR DETERMINING QUANTIFICATION COEFFICIENTS IN PICTURE COMPRESSION CHAINS

[75] Inventor: Martin Bolton, Tullins, France

[73] Assignee: SGS-Thomson Microelectronics S.A., Saint Genis, France

[21] Appl. No.: 448,829

[22] Filed: May 24, 1995

[30] Foreign Application Priority Data

May 27, 1994 [FR] France .................. 94 06725

[51] Int. Cl.⁶ .................................................. H04N 7/26
[52] U.S. Cl. ............... 364/514 R; 348/405; 348/422; 382/251; 341/200
[58] Field of Search .................... 348/405, 419, 348/399, 404, 422; 382/251; 364/514 R; 341/200

[56] References Cited

U.S. PATENT DOCUMENTS

| | | | |
|---|---|---|---|
| 5,038,209 | 8/1991 | Hang | 358/136 |
| 5,136,376 | 8/1992 | Yagasaki et al. | 358/133 |
| 5,144,424 | 9/1992 | Savatier | 358/133 |
| 5,146,324 | 9/1992 | Miller et al. | 358/133 |
| 5,231,484 | 7/1993 | Gonzales et al. | 358/133 |
| 5,245,427 | 9/1993 | Kunihiro | 358/133 |
| 5,263,100 | 11/1993 | Kim et al. | 382/251 |
| 5,267,037 | 11/1993 | Sugiyama | 358/136 |
| 5,283,646 | 2/1994 | Bruder | 348/415 |
| 5,301,242 | 4/1994 | Gonzales et al. | 382/56 |
| 5,379,351 | 1/1995 | Fandrianto et al. | 382/250 |
| 5,426,463 | 6/1995 | Reininger et al. | 348/405 |
| 5,432,556 | 7/1995 | Hatano et al. | 348/415 |

OTHER PUBLICATIONS

French Search Report for French Patent Application No. 94/06725 filed May 27, 1994.

*Primary Examiner*—Douglas W. Olms
*Assistant Examiner*—Min Jung
*Attorney, Agent, or Firm*—Wolf, Greenfield & Sacks, P.C.; James H. Morris

[57] ABSTRACT

A circuit determines a quantification coefficient to be provided to a quantizer incorporated in a picture macroblock compression chain. A first counter counts the number of bits of each macroblock compressed by the compression chain. A first accumulator integrates the difference between each number provided by the first counter and a target, and provides a value corresponding to the quantification coefficient. A microprocessor provides the first accumulator with an initial value and a target at each N macroblocks. Parameters that characterize the current compression process are determined so that the microprocessor determines the target and the initial value to be provided to the first accumulator.

37 Claims, 3 Drawing Sheets

CIRCUIT AND METHOD FOR DETERMINING QUANTIFICATION COEFFICIENTS IN PICTURE COMPRESSION CHAINS

BACKGROUND OF THE INVENTION

1. Field of the Invention

The present invention relates to quantizers used in picture compression circuits according to MPEG or H.261 standards, and more particularly to a circuit for determining the quantization coefficients to be used.

2. Discussion of the Related Art

According to MPEG and H.261 standards, each picture is processed by squares of 16×16 pixels. A "macroblock" constituted by four 8×8-pixels luminance blocks and two 8×8-pixel chrominance blocks corresponds to each square. The terms "luminance pixel" and "chrominance pixel" are used for the sake of simplification (a pixel is, in fact, a combination of luminance and chrominance pixels).

FIG. 1 represents a portion of a picture compression chain according to MPEG and H.261 standards. This chain includes a discrete cosine transform (DCT) circuit 10 processing the macroblocks block by block. The DCT circuit 10 provides for each block a matrix whose coefficients rapidly approach 0 while the position of these coefficients in the matrix get further from the left upper corner of the matrix.

A quantizer 12 processes the coefficients provided by the DCT circuit 10. Quantization achieves a division by a positive quantization coefficient Q. The object of the division is to cancel the coefficients approaching 0 in the matrix provided by the DCT circuit 10.

The output of the quantizer 12 is provided to a circuit 14 carrying out a zigzag scanning (ZZ) and a run/level coding (RLC). The zigzag scanning scans the quantified matrices to provide long sequences of successive null coefficients between two non null coefficients. The RLC provides pairs of numbers whose first pair represents a number of successive null coefficients and the second pair represents the next first non-null coefficient.

A variable length coding (VLC) circuit 16 receives the pairs provided by circuit 14. The VLC circuit 16 replaces the frequent pairs with a short code and the infrequent pairs with a long code. Each code is provided by the VLC circuit 16 on two buses C and L. Bus C provides the code on a determined number of lines, generally lower than the number of lines of the bus. Bus L provides the code length, that is, indicates the number of lines effectively used by the code on bus C.

A packing circuit 18 juxtaposes the codes provided by the VLC circuit 16 by eliminating the non-used bits of bus C. The juxtaposed codes constitute the compressed data CD.

A major problem for implementing data compression lies in the selection of the quantization coefficient Q. Standards MPEG and H.261 authorize the modification of coefficient Q at each macroblock but do not recommend any particular rule to select the coefficient.

The value of the coefficient Q is conventionally selected as a function of the number of bits provided by the compression of each macroblock. As represented, the packing circuit provides a circuit 20 calculating the coefficients Q with the number of bits of each compressed macroblock. The number of bits per macroblock is obtained, for example, by cumulating the lengths L of the codes provided by the VLC circuit for each macroblock.

FIG. 1 illustrates a conventional method for determining the quantization coefficient Q, referred to hereinafter as a target method. This method provides setting a target, or objective, indicating the desired number of bits for each compressed macroblock, and adjusting the quantization coefficient at each macroblock by circuit 20 so that the actual number approaches the target.

FIG. 2 represents, in solid lines, the effective variation over time of the number of bits of a compressed picture as a function of the number of processed macroblocks MB. The selection of a target for the macroblocks, determines a theoretical linear variation over time, drawn in dotted lines.

Prior to the processing of the first picture macroblock, the quantization coefficient Q is initialized. The first macroblock is processed with this quantization coefficient Q and the number of bits increases according to a determined slope.

As soon as the first macroblock is processed, its number of bits is compared with the target, and the quantization coefficient is modified proportionally to the difference. In the represented example, the number of bits is higher than the target and the quantization coefficient is increased.

In practice, because of the time delays introduced in the processing sequence and in the negative feedback sequence (circuit 20) of a method such as a target method, the value of a quantization coefficient calculated at the end of a first macroblock is determined too late to be applied to the second macroblock; the value is applied to the third macroblock only. This time delay is little impairing because successive macroblocks are often similar.

With this method, the effective variation of the number of bits of a picture oscillates about the theoretical variation, the slope of the variation varying at each macroblock to approach the theoretical variation determined by the target.

When the target is determined to be the same for all the pictures, this target method is advantageous since it can be easily implemented in a wired system. However, the compression quality significantly varies from one picture to the other.

To avoid this drawback, some users desire to modify the target from one picture to the other according to criteria determined during the processing of preceding pictures. However, this method is particularly complex to implement in a wired system and its software implementation would be too slow to carry out a real time compression.

Assigning a constant target to a picture provides a variable quality of the picture compression due to the different levels of complexity that may exist in a picture.

SUMMARY OF THE INVENTION

An object of the present invention is to provide a circuit for determining the quantization coefficient having a particularly simple structure while providing a particularly fast determination of the quantization coefficients according to complex methods.

Another object of the present invention is to provide such a circuit implementing a target method wherein the target may vary within a single picture.

A further object of the present invention is to provide such a circuit for implementing, with a single structure, a large number of different methods for determining the quantization coefficient.

To achieve these objects, an embodiment of the present invention provides a circuit implementing, by hardware, simple functions carried out at a high speed, and, by software, complex functions carried out at a low speed. Particularly, the circuit is designed to implement by hardware a process wherein the target is constant, the target being stored in a register whose content can be modified by a microprocessor carrying out a program designed to allow determination of a variable target from one picture to the next one, and also to allow a target to be varied within one picture.

The present invention is more particularly directed to a circuit for determining a quantization coefficient to be provided to a quantizer included in a chain for compressing pictures by macroblocks, including a first counter counting the number of bits of each macroblock compressed by the compression chain; a first accumulator integrating, from an initial value, the difference between each number provided by the first counter and a target, and providing a value corresponding to the quantization coefficient; a microprocessor providing the first accumulator with an initial value at least at each picture and a target at each N macroblocks, where N is a number lower than the number of macroblocks contained in a picture; and means accessible by the microprocessor, providing parameters characterizing the current compression process so that the microprocessor determines the target and the initial value to provide to the first accumulator.

According to an embodiment of the invention, the above-mentioned means include a second counter counting the number of bits in each group of N compressed macroblocks; a second accumulator integrating the quantization coefficients used for each group of N macroblocks; and a control circuit interrupting the microprocessor at the end of each group of N macroblocks, so that the microprocessor reads the contents of the second counter and of the second accumulator and calculates, depending on these contents, a target and an initial value provided to the first accumulator.

According to an embodiment of the invention, the circuit includes a multiplier receiving the content of the first accumulator and a gain contained in a register accessible by the microprocessor, the output of the multiplier providing the quantization coefficient.

According to an embodiment of the invention, the circuit includes a third counter counting the number of bits in each block of compressed macroblocks, the numbers provided by this third counter being accessible by the microprocessor so that the circuit has a mode with two compression steps for each picture. During the first step, the microprocessor must cumulate the number of bits per block to determine gains to be provided to the multiplier during the second step.

The foregoing and other objects, features, aspects and advantages of the invention will become apparent from the following detailed description of the present invention when taken in conjunction with the accompanying drawings.

DETAILED DESCRIPTION

Figure 1:
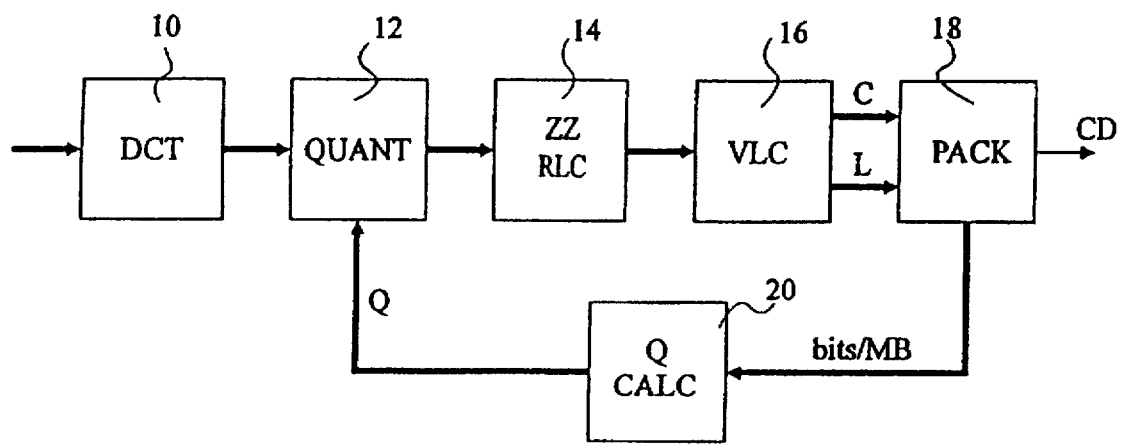
FIG. 1, above described, partially represents a portion of a picture compression chain according to MPEG and H.261 standards.
Figure 3:
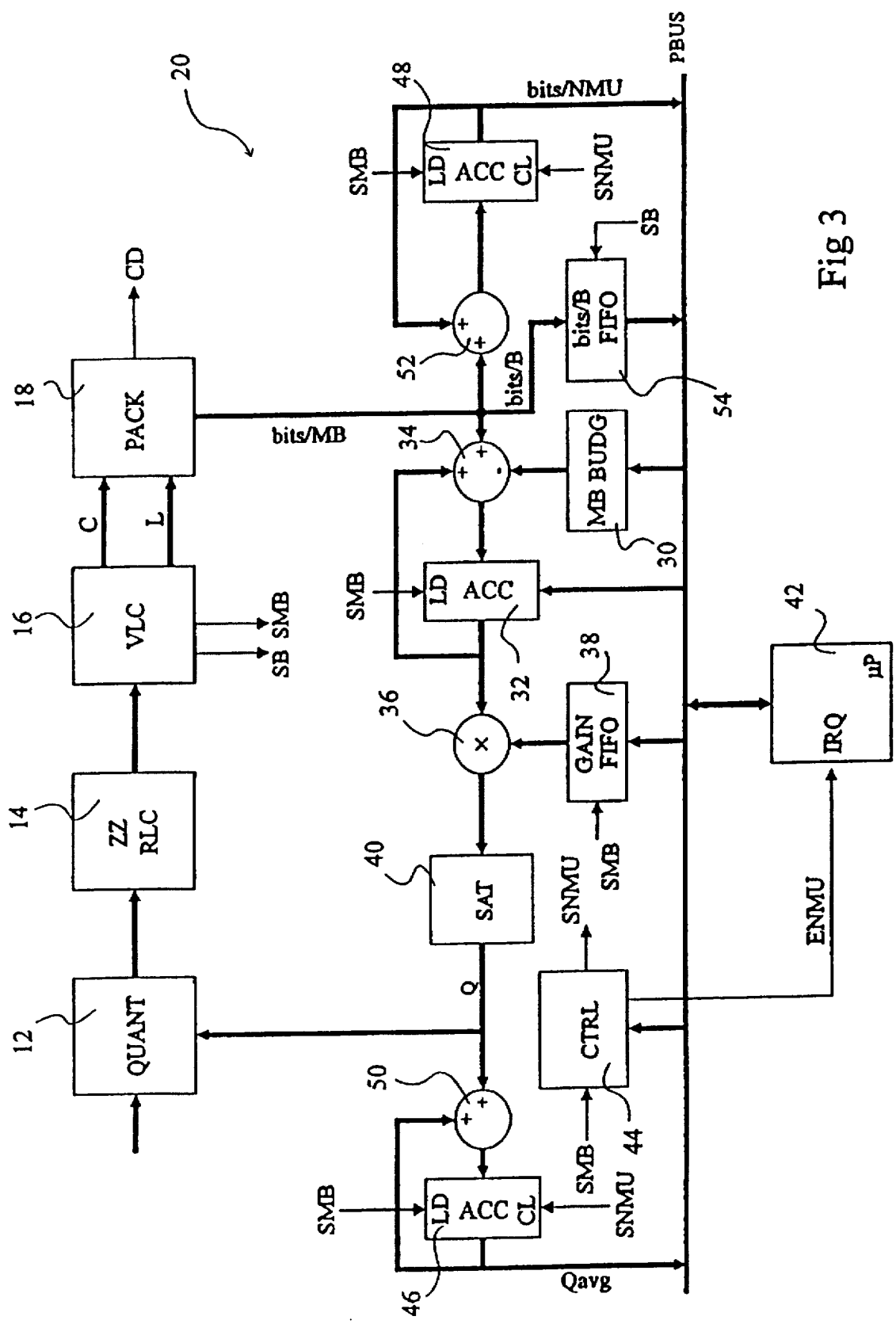
FIG. 3 represents the processing sequence of FIG. 1 including an embodiment of a circuit according to the present invention for determining a quantization coefficient to be used in the chain.

In FIG. 3, the same elements as those in FIG. 1 are designated with the same references. The invention provides a circuit 20 for calculating the quantization coefficients Q to be provided to the quantizer 12. FIG. 3 represents an embodiment according to the present invention of circuit 20.

According to the invention, the calculation circuit 20 is designed for implementing in a wired manner simple functions that may be carried out frequently, for example, at each macroblock, and which are in addition common to most of the methods for determining the quantization coefficients. These functions relate in particular to the determination of the quantization coefficient Q from a constant target. Furthermore, according to the present invention, this target can be readjusted for each picture or even for each picture portion, by a microprocessor that implements complex functions that need not be frequently executed, for example, for each picture or portion of picture. These complex functions are, for example, the determination of the target of a picture to be processed from characteristics provided during the processing of the preceding picture. These functions, that may be programmed by a user or other circuitry, can be implemented with a single structure of the calculation circuit 20.

According to one embodiment, the calculation circuit 20 includes a register 30 in which a target of bits per macroblock is stored. The difference between the number of bits per macroblock provided by the packing circuit 18 and the target 30 is accumulated in a register 32 each time a macroblock is processed. For this purpose, register 32 stores, at the rate of a macroblock synchronization signal SMB, the output of an adder 34 which receives the output of register 32, the number of bits per macroblock provided by the packing circuit 18 and, at a subtraction input, the target 30. The content of register 32 may be regularly reset to an initial value, for example each time picture processing begins.

The synchronization signal SMB may be, for example, provided by the VLC circuit 16 at each beginning of a variable length coding of a macroblock.

The number of bits of each macroblock is obtained, for example, by accumulating in a register (not shown) the code lengths provided by the VLC circuit 16 on bus L, this register being reset at each macroblock by signal SMB.

The quantization coefficient Q to be provided to the quantizer 12 constitutes the output of multiplier 36 which multiplies the output of register 32 by a gain stored in register 38. Since MPEG and H.261 standards require a maximum limit for the quantization coefficient Q, the output of multiplier 36 may be limited to this maximum value by a saturation circuit 40.

The feedback sequence above described implements the target method using a constant target for all the processed pictures.

Moreover, in this embodiment, the target register 30 is connected to a microprocessor 42 through a bus PBUS, which makes it possible for the microprocessor 42 to modify the target. The present invention allows a user or other circuitry to select the modification of the target by units of N macroblocks, where N is a number chosen by the user between 1 and the number of macroblocks of a picture. The lower number N is, the higher the quality of the picture compression, due to the homogenization of the quality of each picture, but the more microprocessor 42 will be used. Thus, the user can make a trade-off between the desired quality and the power of his microprocessor.

Number N is, for example, stored in a register of a control circuit 44, accessible by the microprocessor 42 which writes number N in the register at each powering on. The control circuit 44 receives the macroblock synchronization signal SMB, from which it generates a synchronization of N-macroblocks unit (SMMU) signal and an end of N-macroblocks unit (ENMU) signal. Signal ENMU is activated before the end of each unit of N macroblocks, for example at the beginning of the last macroblock of the unit, and its activation constitutes an interruption request IRQ of the microprocessor 42. Microprocessor 42 processes each of these interruptions by calculating a new target and by writing the latter in register 30.

To calculate the target, conventional methods require parameters such as the average quantization coefficient Qavg used for the macroblocks of the preceding picture as well as the number of bits provided during compression of the preceding picture.

The circuit according to an embodiment of the present invention provides that the average quantization coefficient Qavg and the corresponding number of bits are supplied at each unit of N macroblocks and not at each picture. Thus, it is possible to use these parameters to determine the target of the next unit, or to store these parameters for each picture to determine the targets of the units of the next picture.

At each interruption of the microprocessor 42, an average quantization coefficient Qavg is present in a register 46 and the number of bits of the corresponding unit is present in register 48.

Register 46 accumulates at each macroblock the quantization coefficient that is used. For this purpose, register 46 may be enabled by the macroblock synchronization signal SMB and receives the output of an adder 50 which sums the content of register 46 and the quantization coefficients Q.

At each macroblock, register 48 accumulates the number of bits per macroblock provided by the packing circuit 18. For this purpose, register 48 is enabled by the macroblock synchronization signal SMB and receives the output of an adder 52 which sums the content of register 48 and the number of bits per macroblock.

Registers 46 and 48 may be reset by the synchronization signal of macroblock unit SNMU.

The parameters stored in registers 46 and 48 are accessible by the microprocessor 42 which reads them at each interruption and calculates as a function of these parameters, or of those stored during the processing of a preceding picture, the new target to write in register 30.

There are many methods for calculating a target from an average quantization coefficient Qavg and from the corresponding number of bits; they need not be described here.

The possibility of modifying a target at each portion of a picture (at each unit of N macroblocks, for example), makes it possible to assign high targets to complex portions of a picture and low targets to less complex portions of a picture to homogenize the compression quality in a picture.

As mentioned above, each interruption of the microprocessor 42 occurs before the end of the processing of a unit of N macroblocks, for example, at the beginning of the last macroblock of the unit. This operation mode allows the microprocessor 42 to have time fox updating the target in register 30 before processing the next picture. In some cases, the microprocessor may have not time enough to update the content of register 30. To avoid the resulting problems, the microprocessor 42 may enable a bit in a register of the control circuit 44 once it has modified the content of register 30. If this bit is not enabled before the beginning of the next unit, the processing may be interrupted until this bit is enabled.

With this operation mode, the average quantization coefficient Qavg and the corresponding number of bits are in fact calculated on N−1 macroblocks for each unit of N macroblocks. This very little affects the calculation of the target because two successive macroblocks, especially the last two macroblocks of a unit, are usually similar.

In contrast, when number N is chosen equal to 1, the circuit is such that the average quantization coefficient Qavg (in this case, the quantization coefficient Q) and the number of bits provided for a first macroblock are used to calculate the target assigned to the third macroblock.

As represented, registers 32 and 38 are connected to the bus PBUS, which makes it possible for the microprocessor 42, at each interruption, to modify the gain of the feedback chain in register 38 and to determine the initial accumulation value in register 32.

The calculation circuit of the quantization coefficient more particularly allows to easily and efficiently implement a conventional method for calculating the quantization coefficient Q with a two-step process for each picture.

The two-step processing of a picture consists in counting, during a first step, the number of bits of each compressed picture block achieved by using a fixed quantization coefficient. Then, a correction coefficient of the quantization coefficient may be determined for each macroblock according to various conventional methods, which need not be described here. During the second step, in which the original picture is again compressed, the quantization coefficient is determined normally by the feedback chain, but it is modified at each macroblock by the corresponding correction coefficient provided during the first step.

To carry out a two-step processing, the microprocessor 42 enables a corresponding bit of a register of the control circuit 44. During the first step, the content of register 30, corresponding to the quantization coefficient, is not modified (for example, signal SMB is prevented from enabling this register). The number of bits per block is provided to a memory 54 of the first-in/first-out (FIFO) type enabled by a block synchronization signal SB (provided, for example, by the VLC circuit). The numbers of bits per block are provided, for example, by accumulating in a register (not shown) the code lengths provided by the VLC circuit on bus L, this register being reset at each block by signal SB. The size of the FIFO memory 54 is at least 6N numbers. Thus, at each interruption of the microprocessor 42, the microprocessor clears the FIFO memory 54 and determines, as a function of its content, the correction to make to the corresponding N quantization coefficients during the second step.

During the second step, the quantization coefficient Q is normally determined by the circuit, but microprocessor 42 modifies the gain contained in register 38 at each macroblock. For this purpose, preferably, register 38 is a FIFO memory whose size is at least N gains. Thus, the microprocessor 42 fills the FIFO memory 38 with a new series of N gains at each interruption. The gains are provided to the multiplier 36 at the rate of the macroblock synchronization signal SMB.

Figure 4:
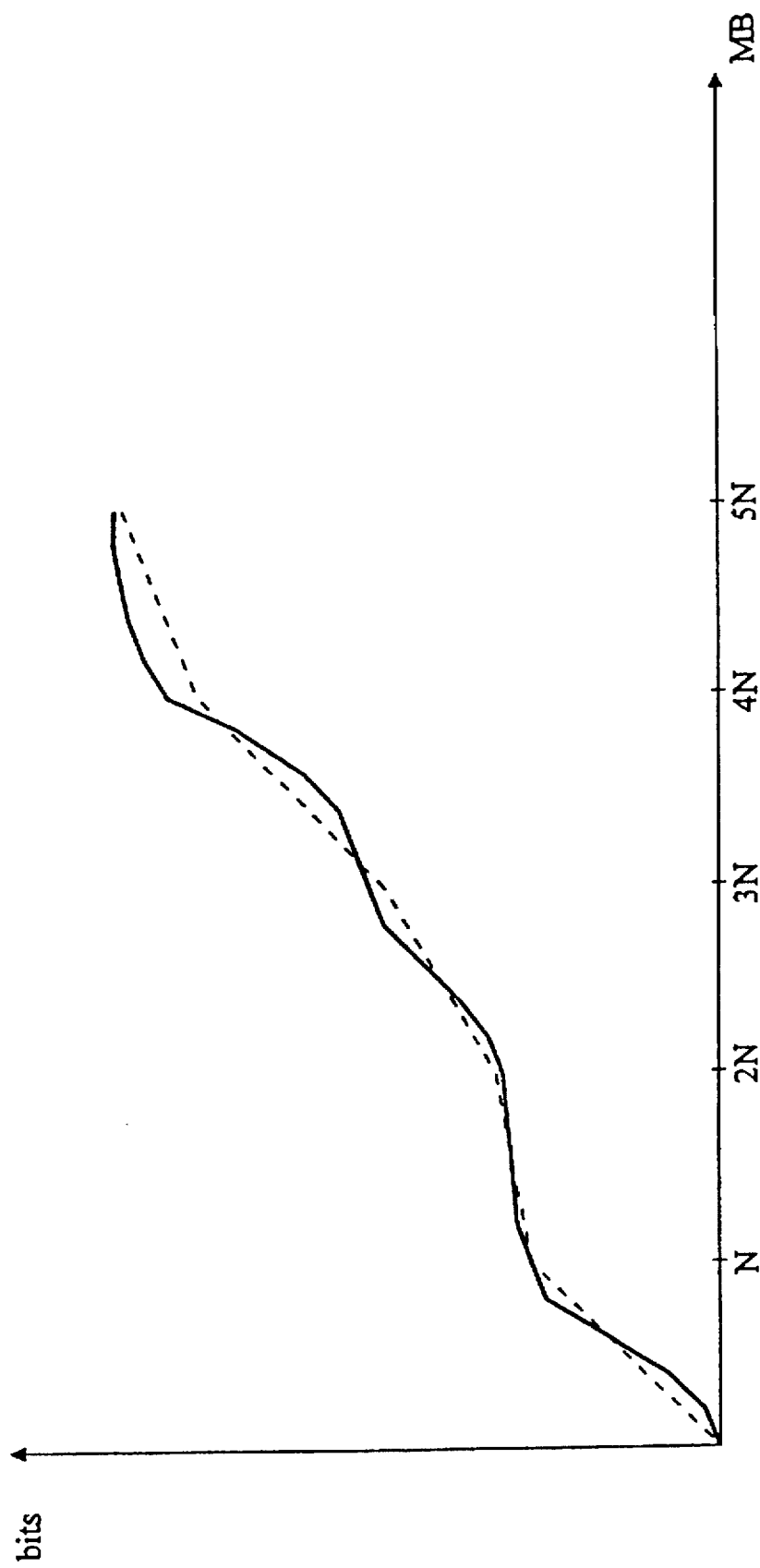
FIG. 4 represents the variation of the number of bits of a picture being compressed by the circuit of FIG. 3.

FIG. 4 represents an exemplary variation of the number of bits versus the number of processed macroblocks, obtained by the calculation circuit according to the present invention. FIG. 4 is similar to FIG. 2 which represents in dotted lines the ideal variation determined by the targets and in solid lines the actual variation.

Figure 2:
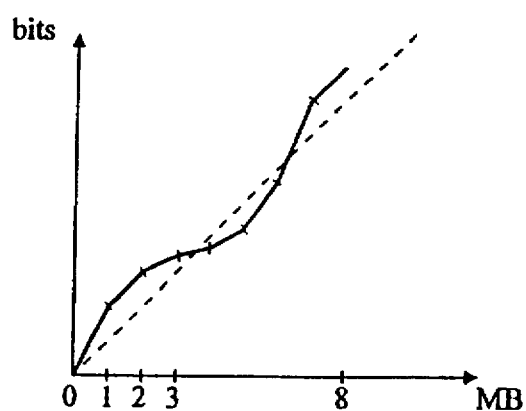
FIG. 2, above described, represents a diagram of the variation of the number of bits of a picture during compression.

FIG. 4 differs from FIG. 2 by the fact that the ideal variation, drawn in dotted lines, gradually varies, at each N macroblocks, corresponding to the target modifications.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

I claim:

1. A circuit for determining a quantization coefficient to be provided to a quantizer in a picture macroblock compression chain, the circuit comprising:

a first counter for counting a number of bits of each macroblock compressed by the compression chain;

a first accumulator, coupled to the first counter, for accumulating from an initial value a difference between each number provided by the first counter and a target value, and for providing as an output a current value corresponding to the quantization coefficient based upon the difference accumulated from initial value.;

a microprocessor programmed to provide the first accumulator with the initial value, at least at each picture, and a target value at each N macroblocks, where N is a number lower than the number of macroblocks contained in a picture; and means, coupled to the microprocessor, for determining parameters characterizing the current compression process, the microprocessor being programmed to determine the target value and the initial value provided to the first accumulator from the parameters.

2. The circuit of claim 1, wherein the means for determining includes:

a second counter having a content that represents a count of a number of bits in each group of N compressed macroblocks;

a second accumulator having a content representing an integration of the quantization coefficients used for each group of N macroblocks; and a control circuit for generating an interrupt to the microprocessor at a completion of each group of N macroblocks, so that the microprocessor reads the content of the second counter and the content of the second accumulator and calculates the target value and the initial value as a function of the content of the second counter and the content of the second accumulator.

3. The circuit of claim 1, further including a multiplier that receives the content of the first accumulator and a gain, the output of the multiplier providing the quantization coefficient.

4. The circuit of claim 3, further including a third counter for counting the number of bits in each block of the compressed macroblocks, the numbers counted by the third counter being accessible by the microprocessor, so that the circuit operates in a two-step compression mode for each picture, wherein the microprocessor is programmed to cumulate the number of bits of compression achieved for each block during a first step, and the microprocessor is programmed to determine a gain for each block and provide the gain for each block to the multiplier during a second step.

5. The apparatus of claim 4, wherein the multiplier further includes a saturation circuit that limits the output of the multiplier to a maximum quantization coefficient value.

6. An apparatus for determining a series of quantization coefficients to be used by a data compressor, the data compressor providing a series of bit counts that each represents an amount of compression achieved by the data compressor, the apparatus comprising:

a bit count difference accumulator, having a first input that receives the series of bit counts, a second input that receives a target value, and an output that provides an accumulated difference between the target value and each bit count;

a gain circuit, having an input coupled to the output of the bit count difference accumulator and an output that provides the series of quantization coefficients by multiplying the accumulated difference by a gain value; and means for adjusting the target value and for providing the target value to the bit count accumulator.

7. The apparatus of claim 6, wherein the data compressor is a video compression circuit for compressing macroblocks of pictures, and wherein the means for adjusting includes means for adjusting the target value within a picture.

8. The apparatus of claim 7, wherein the means for adjusting the target value includes means for assigning high targets to complex portions of the picture and for assigning low targets to less complex portions of the picture.

9. The apparatus of claim 6, wherein the gain circuit further includes a saturation circuit that limits the output of the gain circuit to a maximum quantization coefficient value.

10. The apparatus of claim 6, wherein the means for adjusting the target value includes means for adjusting the target value based on an average value of a number of previous quantization coefficients.

11. The apparatus of claim 10, wherein the means for adjusting the target value further includes means for adjusting the target value based on an accumulated amount of compression achieved that corresponds to the number of previous quantization coefficients.

12. The apparatus of claim 11, wherein the means for adjusting the target value further includes means for selecting the number of previous quantization coefficients.

13. The apparatus of claim 6, wherein the means for adjusting the target value includes means for adjusting the target value based on an accumulated amount of compression achieved for data previously compressed by the data compressor.

14. The apparatus of claim 6, wherein the means for adjusting the target value includes means for adjusting the gain value.

15. The apparatus of claim 14, wherein the means for adjusting the gain value includes means for determining the gain value for a series of data based on previous compression achieved for the series of data using a fixed quantization coefficient.

16. An apparatus for determining a series of quantization coefficients to be used by a data compressor, the data compressor providing a series of bit counts that each represents an amount of compression achieved by the data compressor, the apparatus comprising:

a bit count difference accumulator, having a first input that receives the series of bit counts, a second input that receives a target value, and an output that provides an accumulated difference between the target value and each bit count;

a gain circuit, having an input coupled to the output of the bit count difference accumulator and an output that provides the series of quantization coefficients by multiplying the accumulated difference by a gain value; and a target value adjustment circuit having a first input that receives the series of quantization coefficients from the gain circuit and a second input that receives the series of bit counts, the target value adjustment circuitry providing to the bit count difference accumulator the target value, the target value being based on the series of quantization coefficients and the series of bit counts.

17. The apparatus of claim 16, wherein the data compressor is a video compression circuit for compressing macroblocks of pictures, and wherein the target value adjustment circuit includes a microprocessor programmed to adjust the target value within a picture.

18. The apparatus of claim 17, wherein the microprocessor is further programmed to assign high targets to complex portions of the picture and for assigning low targets to less complex portions of the picture.

19. The apparatus of claim 16, wherein the gain circuit further includes a saturation circuit that limits the output of the gain circuit to a maximum quantization coefficient value.

20. The apparatus of claim 16, wherein the target value adjustment circuit includes a microprocessor programmed to adjust the target value based on an average value of a number of previous quantization coefficients.

21. The apparatus of claim 20, wherein the microprocessor is further programmed to adjust the target value based on an accumulated amount of compression achieved that corresponds to the number of previous quantization coefficients.

22. The apparatus of claim 21, wherein the microprocessor is further programmed to select the number of previous quantization coefficients.

23. The apparatus of claim 16, wherein the target value adjustment circuit includes a microprocessor programmed to adjust the target value based on an accumulated amount of compression achieved for data previously compressed by the data compressor.

24. The apparatus of claim 16, wherein the target value adjustment circuit includes a microprocessor programmed to adjust the gain value.

25. The apparatus of claim 24, wherein the microprocessor is programmed to determine the gain value for a series of data based on previous compression achieved for the series of data using a fixed quantization coefficient.

26. The apparatus of claim 16, wherein the target value adjustment circuit includes:
  an average quantization coefficient accumulator having an input coupled to the output of the gain circuit, and an output that provides an average value of a number of previous quantization coefficients;
  a bit count sum accumulator having an input that receives the series of bit counts, and an output that provides an accumulated amount of compression achieved for data, corresponding to the number of previous quantization coefficients, previously compressed by the data compressor; and
  a microprocessor programmed to adjust the target value based on the output of the average quantization coefficient accumulator and the output of the bit sum accumulator.

27. The apparatus of claim 26, wherein the target value adjustment circuit further includes an externally adjustable control register containing a value equal to the number of previous quantization coefficients to be used by the microprocessor.

28. A method for determining a series of quantization coefficients to be used by a data compressor, the data compressor providing a series of bit counts that each represents an amount of compression achieved by the data compressor, the method comprising the steps of:
  accumulating a difference between a target value and each bit count;
  multiplying the accumulated difference by a gain value to yield one of the series of quantization coefficients; and
  adjusting the target value.

29. The method of claim 28, wherein the data compressor is a video compression circuit for compressing macroblocks of pictures, and wherein the step of adjusting includes the step of adjusting the target value within a picture.

30. The method of claim 29, wherein the step of adjusting the target value includes steps of:
  assigning high targets to complex portions of the picture; and
  assigning low targets to less complex portions of the picture.

31. The method of claim 28, wherein the step of multiplying includes the step of limiting the quantization coefficient to a maximum value.

32. The method of claim 28, wherein the step of adjusting the target value includes the step of adjusting the target value based on an average value of a number of previous quantization coefficients.

33. The method of claim 32, wherein the step of adjusting the target value further includes the step of adjusting the target value based on an accumulated amount of compression achieved that corresponds to the number of previous quantization coefficients.

34. The method of claim 33, wherein the step of adjusting the target value further includes the step of selecting the number of previous quantization coefficients.

35. The method of claim 28, wherein the step of adjusting the target value includes the step of adjusting the target value based on an accumulated amount of compression achieved for data previously compressed by the data compressor.

36. The method of claim 28, further comprising a step of adjusting the gain value.

37. The method of claim 36, wherein the step of adjusting the gain value includes the step of determining the gain value for a series of data based on previous compression achieved for the series of data using a fixed quantization coefficient.

* * * * *